United States Patent Office 3,351,569
Patented Nov. 7, 1967

3,351,569
PROCESS FOR THE PREPARATION OF EXPANDABLE POLYMERIC PRODUCTS
Leonardus J. Revallier, Coenraad L. de Booijs, and Cornelis Verweel, Geleen, Netherlands, assignors to Stamicarbon N.V., Heerlen, Netherlands
No Drawing. Filed Dec. 3, 1962, Ser. No. 241,498
Claims priority, application Netherlands, July 11, 1962, 280,836
18 Claims. (Cl. 260—2.5)

The invention relates to a process for the preparation of expandable products by contacting a crystalline polymer of ethylene or propylene, by which is to be understood a homo- or copolymer of ethylene and/or propylene, containing less than 20 mol. percent of other monomers, with a liquid blowing agent. The invention also relates to expandable products obtained by this process, and to the manufacture of multi-cellular objects from the said products, as well as to the multi-cellular objects thus made.

According to the British patent specification 837,723 expandable products can be prepared from a polymer, or copolymer, of ethylene or propylene by mixing the polymer in the molten state under pressure with a blowing agent that is liquid under the said conditions. This product is then allowed to expand by extruding it from the mixing zone into a space where a lower pressure prevails, as a result of which a multi-cellular object is produced. In this operation the size of the cells can be controlled by addition of a finely divided solid, such as calcium silicate, zinc stearate or magnesium stearate, in an amount of 0.1–2 percent by weight with respect to the amount of the polymer.

This process has the drawback that a pressure-resistant equipment is needed for introducing the blowing agent into the mixing zone. In addition, it is usually necessary then to employ much more blowing agent than is needed for expanding the polymer because a portion of the blowing agent is not mixed with the polymer, but is discharged from the mixing zone as a separate phase and, in consequence, does not contribute to the expansion of the polymer, furthermore, the temperature of the melt during the expansion may vary only within very narrow limits.

A much simpler process for the preparation of expandable products from polymers, or copolymers, of styrene or polymethylmethacrylate is described in the British patent specification 715,100.

In this process the polymer is impregnated in a finely divided solid state with a liquid blowing agent, whether or not at atmospheric pressure. From the impregnated polymer particles an expanded multi-cellular object can be produced by heating them in a mould at a temperature at which they soften and the blowing agent evaporates. It has also been found that multi-cellular bodies can be made from the said particles simply by bringing the latter into the feed hopper of an injection moulding apparatus. This method, however, proves to be unsuitable in principle for the processing of polymers substantially consisting of ethylene and/or propylene. Although the amount of blowing agent is large enough, the impregnated polymers fail to yield fine-cellular expanded objects.

The Canadian patent specification 629,291 discloses an improvement of the above-mentioned procedure, in which the absorption of the blowing agent by the polystyrene is accelerated and multi-cellular objects with smaller cells are produced by mixing the polymer with appr. 1% by weight of a finely divided inorganic pigment. It is permissible to add larger amounts, but the use of over 8% by weight produces no greater effect.

It has now been found that by contacting crystalline polymers of ethylene or propylene in the solid state with a liquid blowing agent, expandable products can be obtained from which, in contrast to what has been possible so far, fine-cellular expanded objects can be prepared, provided the said polymers contain at least 10% by weight of a finely divided solid inorganic substance.

Consequently, the process according to the invention for the preparation of expandable products by contacting a crystalline polymer of ethylene, or propylene, with a liquid blowing agent is characterized by the fact that the polymer contains at least 10% by weight of a finely divided solid inorganic substance.

It is surprising that in the case of these polymers, which, without being mixed with inorganic solid substance, are capable already of absorbing sufficient blowing agent, mixing with less than 10% by weight of the solid substance only results in an accelerated absorption of the blowing agent, without it being possible to process the polymers thus prepared into multi-cellular objects, while only upon admixture of more than 10% by weight of the solid substance, which, according to the abovementioned Canadian patent specification should not produce any further effect, products are formed that are suitable for being processed into multi-cellular objects.

According to the invention the inorganic solid referred to here may be anyone out of a range of the most widely differing substances. Examples of such solids are finely divided, possibly thermally dried substances, like magnesium oxide, diatomaceous earth, aerosil, $SiO_2$, perlite, kaolin, asbestos powder, silicates, chalk and other carbonates, or mixture thereof.

Preference is given to chalk, or MgO, because of the good results obtained with these substances. They have the added advantage of being cheap and possessing a neutral, white colour.

According to the invention the inorganic substance is used in an amount of at least 10% by weight with respect to the amount of polymer. The amount of inorganic substance should preferably not exceed 50% by weight. More in particular it is preferred to use an amount of 15–35% by weight with respect to the amount of polymer, because the results obtained with this amount are very good, whereas if more than 35% by weight of the solid is used, the increase in the mixing expenses are usually not made good by a further improvement of the product.

According to the invention crystalline polymers of ethylene and/or propylene are employed. By these polymers are to be understood homo- or copolymers of ethylene and for propylene containing less than 20% by weight of other monomers. Examples of such substances are high-pressure polyethylene, low-pressure polyethylene, polypropylene, copolymers of ethylene and propylene and copolymers of ethylene or propylene with acrylonitrile, methyl acrylate or methyl methacrylate, vinyl benzoate, and also mixture of two or more of suchlike substances.

The polymeric substance may also contain dyes, plasticizers, stabilizers, anti-oxidants, corrosion inhibitors, free radical sources, vulcanizing agents, setting agents and the like.

Particularly suited polymeric substances are high-pressure polyethylene, low-pressure polyethylene and polypropylene. By liquid blowing agent is to be understood here a liquid yielding a gaseous phase during expansion. Examples of such liquids are low-boiling aliphatic hydrocarbons, such as butane, pentane, neopentane or hexane, benzene, fully or partially halogenated alkane derivatives, particularly those containing both chlorine and fluorine, such as $CCl_3F$, $CCl_2F_2$, 1.2-dichlorotetrafluorethane, and 1-chloro, 1.2.2-trifluoroethane, methanol, acetone, low-boiling esters, such as methylformiate and methylacetate.

Mixtures can also be used, such as a mixture of an aliphatic hydrocarbon and a fully halogenated alkane derivative containing both chlorine and fluorine, for example, a mixture containing 50–90% by volume of n-pentane.

In case of the polymeric substance should be polyethylene or polypropylene, preference is given to n-pentane. Surprisingly, this substance yields an equally fine-cellular product as a mixture of an aliphatic hydrocarbon and a completely halogenated alkane derivative containing both fluorine and chlorine.

The process according to the invention is preferably carried out by mixing the polymeric substance and solid and contacting the mixture in the solid state with the liquid blowing agent. Mixing the polymeric substance with the solid can be effected by the customary procedures, for example in a kneader. The resulting mixture can be contacted with the blowing agent, either as in powder form or as thin sheets. Preferably, however, it is used in the form of granules, because the expandable product thus obtained can be easily stored and transported—if necessary in closed containers—and processed into multi-cellular objects of any shape desired. Contacting the mixture of polymer and solid with the blowing agent is done by simple immersion in the liquid blowing agent, preferably at room temperature; however, higher or lower temperature may also be used; the treatment is preferably executed under atmospheric pressure.

The expandable polymer particles thus obtained can be processed into multi-cellular objects by heating them in an open or closed mould, after pre-expansion if so desired, or by plasticising them by heating under pressure, for example in an extruder and discharging the plastic mass into a space where a lower pressure prevails.

It has appeared that special advantages can be achieved if the process according to the invention is carried out in the presence of an organic substance which solidifies at a higher temperature than the polymeric substance. It is possible then to produce multi-cellular objects the cells in which are more uniform in size and, moreover, are considerably smaller on the average than the cells in objects made by the known processes.

By organic substance is meant here a carbonanceous, metal-free compound. Prior to the expansion, this organic substance must be present in the melt in a finely divided, i.e. dissolved, emulgated or suspended, state. This can be easily achieved, for example by mixing the organic substance with the polymeric substance at a temperature above the solidifying point of the organic substance. If desired, this mixing step can be carried out separately beforehand or during the polymerizations. The organic substance need not be finely divided before the mixing state.

Furthermore, the solidifying point of the organic substance must be higher—at least 10° C. higher—than the temperature at which the polymer melt starts solidifying. If the solidifying point of the organic substance is 100° C. higher than that of the polymer, the results are considerably less favourable than in the event the difference between the solidifying temperatures is small. A solidifying temperature difference of 20–75° is preferred. It is preferred to use an organic substance the solidifying point of which lies above the temperature of the polymer at the moment when the gas bubbles begin to form.

Consequently, the term "solidifying" mentioned above is used to denote the transition from a plastic melt to the solid state. The solid phase may be either crystalline or amorphous.

The organic substance used is preferably a wax, especially a wholly or partly microcrystalline wax, for example "Hoechst-Wachs E," which belongs to the class of the so-called "ester waxes." Waxes sold under the tradenames "Hoechst-Wachs C," "Abril 10 DS," "Abril PDS" or "Acrawax C" may also be employed.

The amount of organic substance to be added may be varied within wide limits. In most cases this amount will be larger than 0.1% by weight with respect to the amount of polymeric substance, but for economic reasons will not be taken larger than 10% by weight. An amount of 0.5% by weight is preferred.

The multi-cellular products made by the process according to the invention can be used for various purposes, for example as packaging material, and as insulating material against heat, noise and electricity. In the form of sheeting they are also very suited for use as wall coverings, as a substitute for paper and as artificial leather. Furthermore, their low specific gravity makes them particularly suited for use in life-jackets, life-belts and life-boats.

Example 1

730 g. of high-pressure polyethylene (melt index 2), 250 g. of magnesium oxide and 20 g. "Hoechst Wachs C" were mixed in a Banbury mixer at 115° C. Following granulation, the mixture was kept immersed in n-pentane overnight at room temperature under atmospheric pressure. Next, the granules were separated from the liquid.

The granules were then brought into the feed hopper of an extruder with a cylinder temperature of 120–150° C., the temperature near the nozzle being 80–110° C. The thermoplastic material issued into the free atmosphere via the nozzle. In this way a fine-cellular product was obtained, the average diameter of the cells being mostly below 0.1 mm. The density was appr. 0.05. The density of very thin products was higher, but never exceeded 0.2.

Example 2

Example 1 was repeated, but without addition of MgO. A fine-cellular foam could not be obtained in this case.

Example 3

Example 1 was repeated with the difference that 50 g. instead of 250 g. of MgO were added. A fine-cellular foam could not be obtained.

Example 4

Example 1 was repeated with the difference, however, that chalk was used instead of the magnesium oxide and the n-pentane was mixed with 25% by volume of $CCl_3F$ and was fed into the extruder cylinder through a bore in the screw by means of pressure-resistant ancillary equipment. The products had the same properties as those obtained by the process of Example 1.

Example 5

Example 4 was repeated but without addition of chalk. The products were equal to those obtained by the procedure of Example 3, though only when the nozzle temperature was kept within considerably narrower limits.

Example 6

Example 4 was repeated, with the difference, however, that instead of high-pressure polyethylene, low-pressure polyethylene (density 0.953, melt index 0.4) was used. The microcrystalline wax of trademark "Hoechst Wachs C" was replaced by wax of trademark "Abril PDS." The cylinder temperature was 135–170° C. and the temperature near the nozzle was 100–120° C.

The products had the same properties as those obtained by the process of Example 1.

Example 7

Example 1 was repeated, with the difference, however, that asbestos powder was used instead of magnesium oxide, while the n-pentane was mixed with appr. 25% by volume of $CCl_3F$.

The foam products obtained possessed the same properties as those mentioned in Example 1.

Example 8

An amount of impregnated granules of the mixture with 25% by weight of chalk was heated in a hot air current in a copper gauze container. The granules softened at first, an then expanded to form a foam-product of fully agglomerated granules.

We claim:

1. Process for the preparation of expandable products by contacting a crystalline thermoplastic polymer in the solid state selected from the group consisting of thermoplastic polymers of ethylene and propylene with a liquid blowing agent yielding a gaseous phase during expansion, wherein the polymer used is mixed with at least 10% by weight of a finely divided inert inorganic solid nucleating agent selected from the group consisting of magnesium oxide, diatomaceous earth, aerosil, silicon dioxide, perlite, asbestos powder, metal silicates, metal carbonates, and mixtures thereof, and a wax.

2. Process according to claim 1, wherein said finely divided inorganic solid comprises calcium carbonate.

3. Process according to claim 1, wherein said inorganic solid comprises magnesium oxide.

4. Process according to claim 1, wherein said inorganic solid is used in an amount of 15-25% by weight with respect to the polymer.

5. Process according to claim 1, wherein n-pentane is used as the blowing agent.

6. Process according to claim 1, wherein said wax solidifies at a temperature at least 10 C. degrees higher than the temperature at which said polymer solidifies.

7. Process according to claim 6, wherein the wax is a microcrystalline wax.

8. Multi-cellular objects prepared by expansion of expandable products which are obtained by the process of claim 1.

9. Composition comprising a crystalline thermoplastic polymer in the solid state belonging to the group consisting of thermoplastic, non-crosslinked polymers of ethylene and propylene, at least 10% by weight of the polymer of a finely divided inert inorganic solid nucleating agent selected from the group consisting of magnesium oxide, diatomaceous earth, aerosil, silicon dioxide, perlite, asbestos powder, metal silicates, metal carbonates, and mixtures thereof, and at least 0.1% by weight of a wax which solidifies at a temperature of at least ten C. degrees higher than the temperature at which said polymer solidifies, said composition also containing a liquid blowing agent capable of yielding a gaseous phase during expansion.

10. A method for producing cellular plastic having very small cells comprising mixing (1) a crystalline thermoplastic, non-crosslinked polymer in the solid state selected from the group consisting of non-crosslinked polymers of ethylene and propylene containing less than 20 mol percent of other monomers, (2) a liquid blowing agent selected from the group consisting of a low-boiling aliphatic hydrocarbons including butane, pentane, neopentane and hexane, benzene, halogenated alkane derivatives including $CCl_3F$, $CCl_2F_2$, 1,2-dichlorotetrafluoroethane and 1-chloro, 1,2,3-trifluoroethane, methanol, acetone, low-boiling esters including methylformiate and methyl acetate, and mixtures thereof, and (3) between 15% and 35% by weight of a finely divided inert inorganic solid nucleating agent selected from the group consisting of magnesium oxide, diatomaceous earth, aerosil, $SiO_2$, perlite, asbestos powder, metal silicates, metal carbonates, and mixtures thereof, and (4) at least 0.1% by weight of a wax; and converting said liquid blowing agent to a gas to blow said polymer to produce a cellular structure.

11. A method in accordance with claim 10, wherein said mixing is effected by kneading said inorganic solid together with solid particles of said polymer and contacting the resultant mixture with said liquid blowing agent.

12. A method in accordance with claim 10, wherein said liquid blowing agent is converted to gas by heating the mixture.

13. A method in accordance with claim 12, wherein said liquid blowing agent is converted to gas by heating the mixture and extruding it into a zone of lower pressure.

14. A method in accordance with claim 6, wherein said wax solidifies at a temperature no more than 100° C. higher than the temperature at which said polymer solidifies.

15. A method in accordance with claim 14, wherein the solidification temperature of said wax lies between 20° C. and 75° C. above the solidification temperature of said polymer.

16. A method in accordance with claim 14, wherein said wax comprises 0.1% to 10% by weight of the mixture.

17. A method in accordance with claim 16, wherein said wax comprises 0.5% to 5% by weight of the mixture.

18. An object in accordance with claim 8, wherein the cells have an average cell diameter of less than 0.1 mm.

References Cited

UNITED STATES PATENTS

| | | | |
|---|---|---|---|
| 2,577,743 | 12/1951 | De Long | 260—2.5 |
| 2,681,323 | 6/1954 | Groff et al. | 260—28.5 |
| 2,727,879 | 12/1955 | Vincent | 260—28.5 |
| 2,849,028 | 8/1958 | Clark et al. | 260—2.5 |
| 2,875,709 | 3/1958 | Sturm | 260—28.5 |
| 2,941,964 | 6/1960 | Houston et al. | 260—28.5 |
| 2,945,827 | 7/1960 | Henning | 260—2.5 |
| 3,026,272 | 3/1962 | Rubens et al. | 260—2.5 |
| 3,060,138 | 10/1962 | Wright | 260—28.5 |
| 3,067,147 | 12/1962 | Rubens et al. | 260—2.5 |
| 3,072,583 | 1/1963 | Randa | 260—2.5 |
| 3,072,584 | 1/1963 | Karpovich | 260—2.5 |
| 3,098,831 | 7/1963 | Carr | 260—2.5 |
| 3,224,984 | 12/1965 | Roper et al. | 260—2.5 |

MURRAY TILLMAN, *Primary Examiner.*

JAMES A. SEIDLECK, *Examiner.*

M. FOELAK, *Assistant Examiner.*